United States Patent [19]

Carlson

[11] Patent Number: 5,050,025

[45] Date of Patent: Sep. 17, 1991

[54] LEAD SCREW AND FOLLOWER-TYPE HEAD POSITIONER FOR DATA RECORDERS

[75] Inventor: Michael E. Carlson, Ann Arbor, Mich.

[73] Assignee: Irwin Magnetic Systems, Inc., Ann Arbor, Mich.

[21] Appl. No.: 314,454

[22] Filed: Feb. 22, 1989

[51] Int. Cl.⁵ .............................................. G11B 5/55
[52] U.S. Cl. .................................. 360/106; 360/109
[58] Field of Search .................... 360/106, 109, 78.02, 360/77.12, 77.16; 364/426.03

[56] References Cited

U.S. PATENT DOCUMENTS

| 4,110,803 | 8/1978 | Townsend | 360/106 |
| 4,136,369 | 1/1979 | Morgan | 360/106 |
| 4,858,047 | 8/1989 | Cannon et al. | 360/106 |

FOREIGN PATENT DOCUMENTS 0210026  1/1987  European Pat. Off. ............ 360/106

OTHER PUBLICATIONS

IBM Technical Disclosure Bulletin, Hall et al., vol. 20, No. 6, Nov. 1977.

Primary Examiner—A. J. Heinz
Assistant Examiner—Jefferson Evans
Attorney, Agent, or Firm—Price, Heneveld, Cooper, DeWitt & Litton

[57] ABSTRACT

A positioning apparatus used for information-storage devices provides stoppage of a motor-driven transducer head-positioning lead screw follower as the follower approaches the motor-driven end of the lead screw. An element is provided on the follower which contacts a stop carried by the lead screw when the follower arrives at a position spaced from the motor by a predetermined distance, to thereby prevent the follower from moving any closer to the motor than such predetermined distance.

16 Claims, 3 Drawing Sheets

LEAD SCREW AND FOLLOWER-TYPE HEAD POSITIONER FOR DATA RECORDERS

TECHNICAL FIELD

This invention relates to positioning systems and apparatus, particularly those used in information-storage devices, and more particularly to positioning apparatus used in computer data-storage and information-processing systems.

In a still more particular sense, the invention relates to means for positioning transducer heads in data-recording apparatus, particularly such apparatus as utilize a lead screw and follower mechanism to position the transducer heads in a rapid and consistent manner at any of a plurality of adjacent recording tracks across the width of a data-recording member.

BACKGROUND OF THE INVENTION

In multiple-track data-storage apparatus of the type in which the transducer head is stepped or otherwise moved on command to any of a series of parallel recording tracks on a record member, for example magnetic tape drives used in computer systems for data back-up and archival storage purposes, a variety of different positioning mechanisms are or may potentially be used. Most such systems employ stepper motors, which are very accurately controllable since they produce a particular and specific amount of output shaft rotation as a function of the number of excitation pulses applied, and such pulse actuation lends itself to very accurate control.

While a variety of different mechanisms are or may be used to apply the output shaft rotation of the stepper or other such motor to the transducer head itself, various forms of cams are typically employed and worm-drive or lead screw and follower systems are desirable due to the high degree of resolution and accuracy which such systems can provide, although such systems are sometimes difficult to implement due to physical layout and size constraints. Thus, the underlying conditions as well as the particular motion-transmitting structures and componentry used will be quite different in cases where the positioning motors may be located immediately adjacent the location of the transducer heads within the drive architecture, as opposed to cases where the positioning motor must be located at a substantial distance from the transducer head and its mounting structure.

In practically all instances where lead screw-type mechanisms are used for head-positioning in such data-storage applications, however, an ever-present problem which must be dealt with is that of indexing the follower travel along the lead screw, together with limiting follower travel at the end extremity thereof adjacent the drive motor (regardless of whether a stepper motor is employed, or some other form of servo motor). That is, the extent of lead screw follower travel along the lead screw thread can be accurately controlled if an index point is accurately established, but otherwise the follower will move until it ultimately encounters an obstacle, for example the motor housing or other such adjacent structure which is fixed in relation thereto, or simply runs off the end of the lead screw thread.

While it is true that such a condition of abutment will certainly limit the allowable travel of the follower along the lead screw, contact with a fixed stop such as the motor housing will inevitably produce a frictional binding of parts, including frictional jamming of the follower threads upon the lead screw threads and, usually, frictional wedging of the side of the follower against the motor housing or other such fixed structure as well. The result of either of these conditions is very undesirable, since it requires a high degree of motor torque to frictionally disengage (i.e., unjam) the wedged parts from one another, causing a number of significant problems in the positioning system. Furthermore, the specific point where follower travel is limited in this manner will vary from time-to-time, making the index point so generated inconsistent and unreliable, and thereby adversely affecting positioning accuracy during ensuing operation. That is, the drive must be able to generate a consistent and precise index point for the stepper drive electronics during initialization proceeding, but the desired accuracy and location of such an index point is not achieved when the lead screw follower is simply jammed against a stop at an end extremity. Further, of course, such jamming tends to overstress the lead screw and/or follower, and may well result in excess wear and/or early failure.

BRIEF SUMMARY OF THE INVENTION

Accordingly, the objectives and advantages of the present invention are to provide an improved indexing system for motor-driven lead screw and follower drives in the head-positioning systems used in data-storage apparatus. Such an achievement is made in accordance herewith through the provision of novel apparatus associated with the lead screw and follower, and by improved methods of manufacturing and assembly of such apparatus.

Generally speaking, the invention provides a positioning apparatus for transducer heads in data-storage devices which comprises, in combination, a lead screw and follower set which is driven by a positioning motor, for example a stepper, having means for coupling the lead screw follower to a transducer in the data-storage device such that motion of the follower along the lead screw, upon motor-driven rotation thereof, moves the head in relation to data-storage media disposed adjacent the head. In such positioning apparatus, stop means are provided which are fixed with respect to the lead screw and located generally adjacent its motor-driven end, and stop-engagement means are carried with the lead screw follower to engage such stop means at a point disposed radially outward of the lead screw, to thereby preclude further rotation of the lead screw and thus preclude further movement of the follower toward the motor-driven end of the lead screw, restricting movement of the transducer head accordingly.

Viewed from the standpoint of methodology, the present invention provides a process for setting the closest point of approach between an actuator motor and a head-positioning lead screw follower moved by such motor, wherein the lead screw is used to carry an abutment at a preselected location spaced radially from the lead screw, and the lead screw follower is used to carry a stop extending outward from the follower in a direction toward the desired closest point, such stop being positioned radially with respect to the lead screw by an amount sufficient to bring the stop and the abutment into angular contact with one another along an arcuate path spaced radially from the lead screw when the follower has reached the predetermined closest point of approach. In this manner, frictional jamming of the follower with respect to the lead screw is precluded, and a preselected clearance may be maintained between the lead screw follower and adjacent structure when the follower is disposed at its closest allowable point with respect to such structure, providing a highly effective and flexible manufacturing procedure.

The foregoing principal objectives, advantages and features of the invention will become increasingly apparent following consideration of the ensuing specification, considered in conjunction with the attached drawings, which are briefly described immediately below.

DESCRIPTION OF PREFERRED EMBODIMENTS

Figure 1:
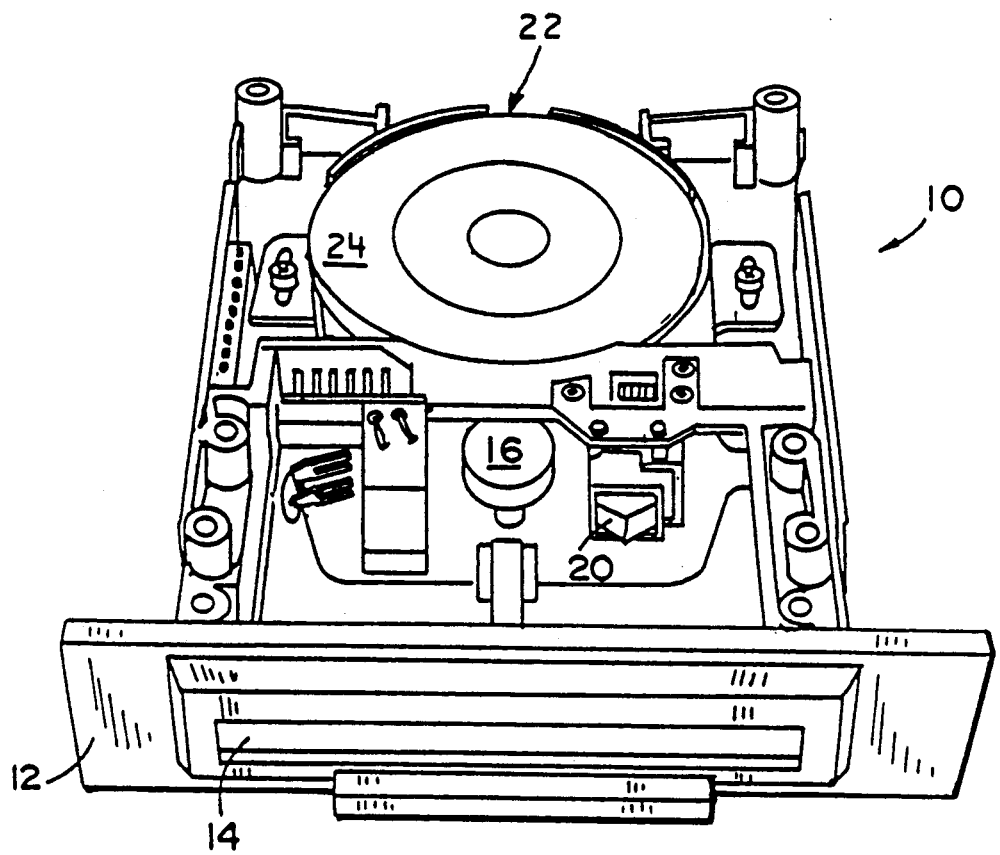
FIG. 1 is a front perspective view of a typical data-storage device in which the invention is used.
Figure 2:
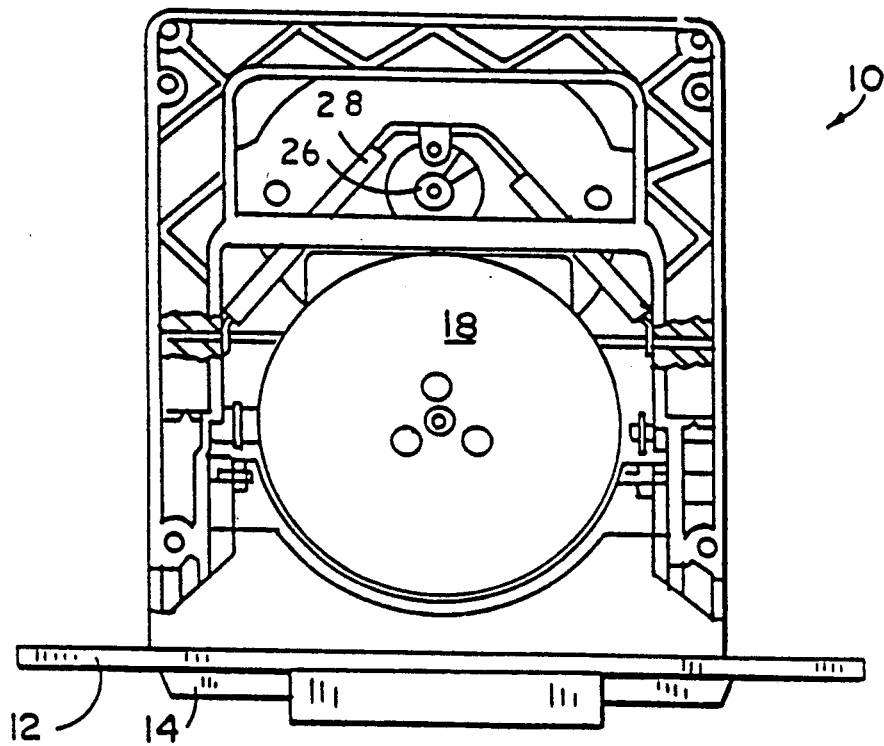
FIG. 2 is a bottom plan view of the device illustrated in FIG. 1, further illustrating the environment for use of the invention and a particular structural setting therefor.

As illustrated in FIGS. 1 and 2, a miniaturized cartridge-type tape drive 10 generally in accordance with known technology constitutes a typical environment in which the invention may be utilized. As illustrated, tape drive 10 includes a face plate 12 which defines a tape cartridge-admittance opening 14 and, internally, includes such major components as a capstan 16 for imparting motion to the tape, a capstan drive motor 18, a transducer head 20 which is mounted for guided vertical movement under control of a positioning system, and a head-positioning means 22 comprising a stepper motor 24, a lead screw and follower 26 driven by stepper 24, and a pivotally-mounted positioning arm 28 which is actuated by the lead screw and follower means 26 to shift the position of head 20 in response to the output rotation of stepper motor 24. For a general description of such a miniaturized cartridge-type tape drive, reference is made to prior U.S. Pat. No. 4,647,994, which is commonly-owned with the present patent, and for a complete description of the particular nature of the head-positioning means 22, and particularly the positioning arm 28, reference is made to commonly-assigned co-pending application Ser. No. 07/314,376, filed Feb. 22, 1989

As indicated above, in accordance with the present invention, the preferred head-positioning means 22 for the drive 10 comprises a lead screw and follower mechanism which is driven by stepper motor 24 and which in turn acts upon positioning arm 28. An exemplary stepper motor 24, lead screw and follower 26, and novel index-setting structure 30 in accordance herewith is illustrated in FIG. 3, in which the lead screw is separately designated by the numeral 32, and the lead screw follower is designated by the numeral 34.

As illustrated throughout the different Figures, the follower 34 preferably comprises a generally rectangular-shaped block-like element having a centrally-threaded aperture 36 engagable with the thread 38 formed along the outside of lead screw 32. Projecting outwardly from one edge of follower 34 is a short, pin-like arm element 40 by which follower 34 is coupled to the pivotal positioning arm 28, in a manner more fully discussed in the aforementioned co-pending application Ser. No. 07/314,376. A feature of the follower member 34 which is of more significance to the present invention, and which is utilized in close cooperation with the indexing structure 30 referred to above, are a series of passages 42 (of which four are shown) extending generally around the periphery of follower 34, at a radial spacing outwardly from lead screw 32, the function and relative operation of which is described more fully hereinafter.

Figure 3:
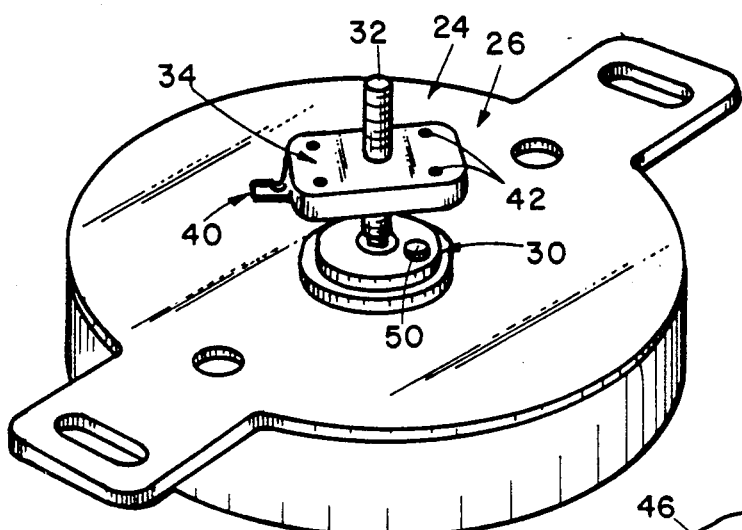
FIG. 3 is an enlarged front perspective view showing a particular preferred implementation of the invention.
Figure 4:
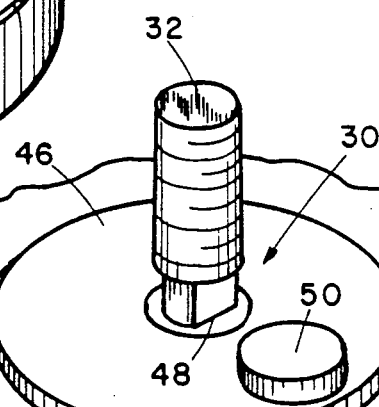
FIG. 4 is a further enlarged, fragmentary, perspective view showing particular structural features of the apparatus in FIG. 3.
Figure 5:
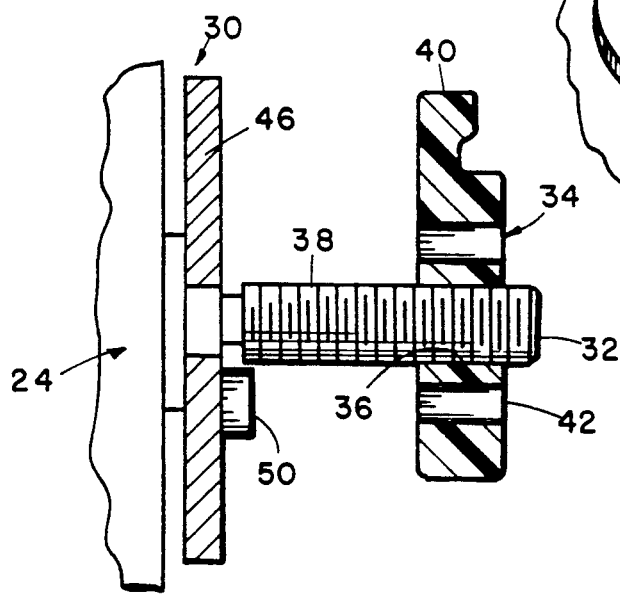
FIG. 5 is a side elevational view of the structure in accordance with the invention.

As generally illustrated in FIGS. 3, 4 and 5, the stepper motor 22 typically has a relatively low, protruding hub-like portion 44 extending laterally from the motor housing, through whose center extends the lead screw 32 (which typically is mounted within stepper 22 by appropriate bearings, etc.), although in other embodiments the lead screw may be a separate element coupled to the stepper motor output shaft by appropriate means. In either event, the lead screw may be said to have a motor-driven end portion, which term is merely employed herein to designate the portion of the lead screw which is located closer to the motor, as opposed to the other end portion, which is located outward from the motor.

Figure 6:
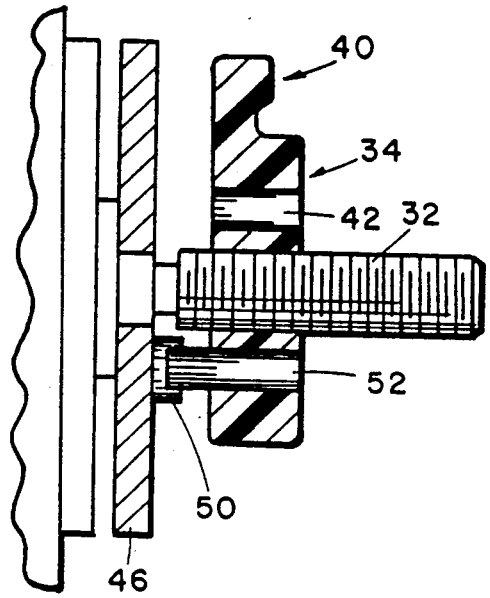
FIG. 6 is an enlarged, fragmentary, side elevational view of the structure shown in FIG. 5, showing the same in an alternative position.
Figure 7:
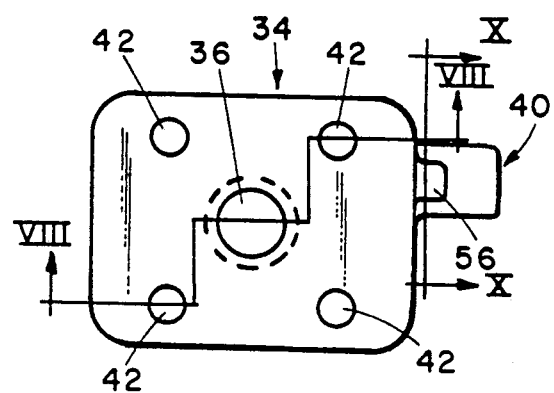
FIG. 7 is an enlarged, top plan view of a lead screw follower in accordance herewith.

As best illustrated in FIGS. 4, 5 and 6, the indexing apparatus 30 includes, in the embodiment under discussion, a rigid disk 46 which is secured to the lead screw shaft 32 in a manner precluding relative rotation therebetween. One way of accomplishing such a mounting is to utilize a non-circular mounting aperture in disk 44, such as that illustrated by the D-shaped mounting aperture 48 shown in FIG. 4, for which there must of course be a complementary flat formed on the lead screw 42 at a point closely adjacent the nearest part of motor 24, e.g., the outer face of its hub 44. Of course, this is really a type of key and keyway, of which many other forms exist, and there are many other ways to accomplish such a connection as well, including merely the use of interfering radii between the aperture in disk 46 and the lower portion of the motor output shaft, in this example lead screw 32, in which arrangement the two parts are merely press-fitted together (in which case it is useful to utilize a somewhat softer material for disk 46 than for lead screw 32).

In any event, disk 46 comprises in effect a continuous series of closely-adjacent radial arms which extend outwardly from lead screw 32, in a plane which in effect establishes the nearest point at which the lead screw follower 34 is to be allowed to approach the housing of motor 24. For purposes explained more fully below, disk 46 carries a stop, or abutment structure, 50 on its upper surface (i.e., the side facing follower 34). While stop 50 may in a broad sense be provided by any desired structure located in the position shown and fixed with respect to disk 46 (and thus fixed with respect to lead screw 32 when disk 46 is non-rotatably secured thereto), in accordance with the preferred embodiment under discussion stop 50 is preferably a small disk, or cylindrical section, of elastomeric material, in the most preferred form urethane rubber, which is adhesively or otherwise secured to the surface of disk 46.

As indicated above, disk 46 in effect establishes a plane immediately adjacent the surface of stepper motor 24 defining the closest point of approach to be allowed follower 34 with respect to motor 24. More specifically, the stop means 50 actually establishes such near point, in accordance with a preferred practice of the invention, in the following manner. As previously noted, lead screw follower 34 carries a plurality of passages 42 extending through it at a distance spaced radially outward from lead screw 32. In order to definitively locate the nearest point of approach for follower 34 with respect to disk 46, follower 34 is threaded onto lead screw 32 during manufacturing assembly and then run along the lead screw thread 38 down to the point where the adjacent surfaces of follower 34 and stop means 50 are very nearly in contact (as representatively shown in FIG. 6). Under these conditions, the particular passage 42 in follower 34 which then most closely approaches stop means 50 is selected, and a pin 52 is inserted through that selected passage 42 to act as an engagement means for the stop 50 upon slight further rotation of the lead screw, in the manner generally illustrated in FIG. 6.

In the foregoing regard, it should be noted that the pin 52 and passages 42 are to be considered exemplary of the underlying functional requirement, other specific forms of such indexing elements no doubt existing. Where the illustrated form of element and receptacle are used, the pin 52 and passages 42 are preferably sized so as to have at least a slight interfering fit diametrically; thus, insertion of pin 52 is in the nature of a press fit, with frictional retention of pin 52 in such position once so inserted. Further, the length of pin 52 is selected so that it will be angularly contacted by stop 50 before the end of pin 52 engages the top of disk 46. As may be appreciated upon reflection, the particular passage 42 which satisfies these conditions will vary from one drive to the next, since even though the starting and stopping point of the threads formed in aperture 36 of follower 34 may be closely controlled (at least where the follower is, as in the preferred embodiment, a molded part), the same is not likely to be true with respect to the threads 38 on lead screw 32, particularly with respect to the actual location of each stop element 50 with respect to the lead screw thread following assembly.

Accordingly, any of the various passages 42 may turn out to be the appropriate one for insertion of pin 52 during actual manufacturing processes, and of course the particular number and arrangement of passages 42 in lead screw follower 34 shown in the drawings hereof is merely illustrative of the general arrangement desired; however, it is considered very advantageous to provide a sequence of such mounting locations so that the index point may be accurately selected, thereby reducing to a minimum any lost motion which may occur when the follower "bottoms-out" against the index point and then reverses direction.

The result obtained in the foregoing manner is an accurately repeatable index point for the follower 34 with respect to lead screw 32 which additionally establishes the closest point to which the follower may approach disk 46 and, thus, the face of motor 24. That is, when the appropriate passage 42 has been selected and pin 52 inserted therein, in the manner set forth above, the ensuing contact between stop 50 and pin 52 upon slight further rotation of lead screw 32 will positively limit any further movement of the follower 34 along lead screw 32, since the follower is of course constrained against rotation relative to the lead screw (for example, as described in co-pending application Ser. No. 07/314,376, and as a result the follower and its mounting structure will preclude further rotation of lead screw 32, through disk 46, when stop 50 moves into abutment against pin 52.

Of course, under the conditions just described, there will still be a space between the underside of follower 34 and the upper surface of disk 46, such that frictional wedging or jamming of the two surfaces against one another will not occur. Instead, rotation of the lead screw 32 is precluded by the angular force vector acting laterally between stop 50 and pin 52, which will be transmitted through follower 34 to whatever means is employed to prevent rotation of the follower with respect to the lead screw, disk 46 being secured to lead screw 32 in a manner precluding any relative rotation therebetween. Therefore, further rotation of lead screw 32 by motor 24 is precluded without any axial loading on the follower, such as would create frictional jamming of the lead screw threads 38 against their counterpart threads 36 in follower 34. As a result, opposite-direction rotation of lead screw 32 during ensuing operation will immediately transport follower 34 in the opposite direction, away from motor 24, since stopper 50 and disk 46 are free to rotate in the opposite direction, without having to "unlock" the follower threads from those of the lead screw or having to unjam adjacent faces of the follower and the positioning disk 46 or the housing of motor 24, such as would otherwise occur.

Figure 8:
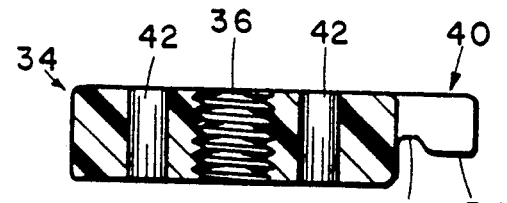
FIG. 8 is a sectional side elevational view thereof, taken along the plane VIII—VIII of FIG. 7.
Figure 10:
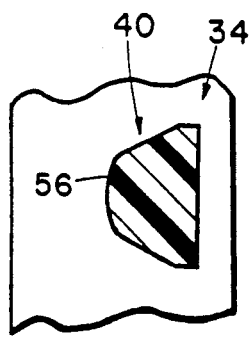
FIG. 10 is an enlarged sectional elevation taken along the plane X—X of FIG. 7.
Figure 9:
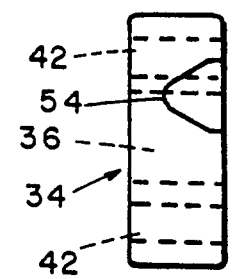
FIG. 9 is an end elevational view thereof.

It will be clear from the foregoing that the disk member 46 may thus be considered to constitute a support for the stop means 50, and as indicated previously it is possible to implement the invention by use of other specific forms of such support means. While the latter is preferably of a rigid nature as described hereinabove, this is not necessarily of the essence in every application of the invention, and it should be borne in mind that the stop member 50 and disk 52 do in fact function together to accomplish their ultimate goal; therefore, various alternatives may be employed in implementing these structures. In the preferred embodiment described above, the stopper 50 is of a shock-absorbing nature, being preferably an elastomeric, or in any event resilient, structure. This is desirable since the stop member 50 will contact the abutment, or pin, 52 with some angular velocity, and it is desirable to cushion the resulting impact (however slight that may be in an absolute sense). Also, of course, such cushioning effect will function to dampen the sound of any such impact, which may well be undesirable if undamped It remains to be pointed out that the preferred form of follower 34 in accordance with the invention comprises an integrally-molded structure which is preferably made of polymeric material. In this form, the short pin-like arm element 40 which serves to couple the follower to the positioner arm (as disclosed in co-pending application Ser. No. 07/314,376) preferably has the particular shape illustrated in FIGS. 5, 6, 7 and 8, in which the surface 54 of which, which engages the positioner arm in the assembled drive 10, is preferably rounded in the manner shown and somewhat elongated to form a smooth, semi-cylindrical projection; however, this projection is preferably interrupted by a recess 56 (FIG. 8) which separates it from the main part of the follower 34.

When in the preferred integrally-formed polymeric structure described, follower 34 may very advantageously be formed from the industrial polymer known by the trademark "DELRIN AF," since unlike other frequently-used industrial polymers, this material has very desirable dimensional stability and that is extremely important in a part such as a lead screw follower. Further, it has been noted that whereas "filled" polymers are frequently used in such applications (i.e., polymers with reinforcing strands such as glass fibers embedded throughout), this is actually undesirable in a part such as the lead screw follower 34, since in the application intended the lead screw undergoes extensive incremental and reciprocatory motion, and it has been found that the glass or other such reinforcing strands in such "filled" polymers will rapidly cause adverse affects on the lead screw thread, abrading it and creating excessive wear, while at the same time breaking down into undesirable dust particles which can rapidly contaminate the data-storage device and, further, cause severe and impermissible corrosive affects in relatively short times.

It is to be understood that the foregoing description of a preferred embodiment of the invention is provided for purposes of the description and illustration, and not as a measure of the invention, whose scope is to be defined by reference to the ensuing claims. Thus, while those skilled in the art may devise embodiments of the particular concepts presented in the foregoing illustrative disclosure which differs somewhat from the particular embodiment shown and described in detail herein, or may make various changes in structural details to the illustrated embodiment, all such alternative or modified embodiments which utilize the concepts of the invention and clearly incorporate the spirit thereof are to be considered as within the scope of the claims appended herebelow, unless such claims by their language specifically state otherwise.

The embodiments of the invention in which an exclusive property or privilege is claimed are defined as follows:

1. Positioning apparatus for movably-mounted transducer heads in data-storage devices, comprising in combination: a lead screw and follower, said lead screw having a motor-driven end portion for imparting rotation thereto and said follower being threadedly engaged with said lead screw to move along the lead screw in response to rotation of the lead screw; means for coupling said follower to at least one movably-mounted transducer head in a data-storage device and for transferring motion of said follower along said lead screw upon rotation thereof to said head to move the head with respect to a storage media in said device; means for stopping the motion of said follower along said lead screw, said stop means fixed to said lead screw for rotation therewith and located generally adjacent said motor-driven end portion; and stop-engagement means carried with said follower to engage said stop means at a point disposed radially outward of said lead screw, said stop means applying an angular force to said stop-engagement means upon further rotation of said lead screw following such engagement to thereby preclude such further rotation of said lead screw, whereby further movement of said follower toward said motor-driven end of said lead screw is precluded; said stop-engagement means carried with said follower to engage said stop means comprising a member projecting away from other portions of said follower and located at a radial distance away from said lead screw, said member being oriented toward said motor-driven end portion of said lead screw; and said projecting member being selectably positionable at one of a plurality of mounting locations carried on said follower.

2. Positioning apparatus according to claim 1, wherein said follower has a plurality of recesses, each for optionally receiving said member.

3. Positioning apparatus according to claim 2, wherein said member comprises a pin-like structure and said recesses have a diameter sized to receive said pin-like structure.

4. Positioning apparatus according to claim 3, wherein said recesses are sized to receive said pin-like structure with a press fit.

5. Positioning apparatus according to claim 1, wherein said means for coupling said follower includes an element fixed with respect to said follower and exposed with respect to other portions of the follower, said element extending generally laterally of said lead screw.

6. Positioning apparatus according to claim 5, wherein said element fixed with respect to said follower comprises a pin-like arm member.

7. Positioning apparatus according to claim 6, wherein said pin-like arm member is formed integrally with said follower.

8. Positioning apparatus according to claim 7, wherein said follower and integral arm member comprise a one-piece molded structure.

9. Positioning apparatus according to claim 8, wherein said one-piece molded structure is formed of non-filled polymeric material.

10. Positioning apparatus for movably-mounted transducer heads in data-storage devices, comprising in combination: a lead screw and follower, said lead screw having a motor-driven end portion for imparting rotation thereto and said follower being threadedly engaged with said lead screw to move along the lead screw in response to rotation of the lead screw; means for coupling said follower to at least one movably-mounted transducer head in a data-storage device and for transferring motion of said follower along said lead screw upon rotation thereof to said head to move the head with respect to a storage media in said device; means for stopping the motion of said follower along said lead screw, said stop means fixed to said lead screw for rotation therewith and located generally adjacent said motor-driven end portion; and stop-engagement means carried with said follower to engage said stop means at a point disposed radially outward of said lead screw, said stop means applying an angular force to said stop-engagement means upon further rotation of said lead screw following such engagement to thereby preclude such further rotation of said lead screw, whereby further movement of said follower toward said motor-driven end of said lead screw is precluded; said stop means comprising a support member secured to said lead screw and shock-absorbing means carried on said support member and having a portion located at said point disposed radially outward of said lead screw for contact by said stop-engagement means; said stop means 11. Positioning apparatus for movably-mounted transducer heads in data-storage devices, comprising in combination: a lead screw and follower, said lead screw having a motor-driven end portion for imparting rotation thereto and said follower being threadedly engaged with said lead screw to move along the lead screw in response to rotation of the lead screw; means for coupling said follower to at least one movably-mounted transducer head in a data-storage device and for transferring motion of said follower along said lead screw upon rotation thereof to said head to move the head with respect to a storage media in said device; means for stopping the motion of said follower along said lead screw, said stop means fixed to said lead screw for rotation therewith and located generally adjacent said motor-driven end portion; and stop-engagement means carried with said follower to engage said stop means at a point disposed radially outward of said lead screw, said stop mean applying an angular force to said stop-engagement means upon further rotation of said lead screw following such engagement to thereby preclude such further rotaiton of said lead screw, whereby further movement of said follower toward said motor-driven end of said lead screw is precluded; wherein said stop means comprises a support member secured to said lead screw and shock-absorbing means carried on said support member and having a portion located at said point disposed radially outward of said lead screw for contact by said stop-engagement means; wherein said stop-engagement means carried with said follower to engage said stop means comprises a member projecting away from other portions of said follower at a radial distance outboard of said lead screw and extending toward said motor-driven end portion of said lead screw; and wherein said projecting member is selectably positionable at one of a plurality of mounting locations carried on said follower.

12. Positioning apparatus according to claim 10, wherein said follower has a plurality of recesses, each for optionally receiving said member.

13. For use in data-storage apparatus, a method of setting a closest point of approach between a motor and a head-positioning lead screw follower moved by said motor, comprising the steps: using a lead screw to carry an abutment which rotates with said lead screw and is disposed at a preselected location spaced radially from said lead screw and generally defining said closest point; and using said follower to a carry a stop element at a location spaced from said follower in a direction toward said closest point and disposed radially from said lead screw by an amount sufficient to bring said stop element and said abutment into angular contact with one another along an arcuate path spaced radially from said lead screw when said follower has reached said closest point of approach, thereby precluding frictional jamming of said follower with respect to said lead screw; including the steps of fixing said abutment on said lead screw, selecting said closest point of approach by moving said follower along said lead screw toward said motor until the follower reaches a desired proximity with said motor, and securing said stop to said follower in a particular location at which it is positioned to contact said abutment upon further rotation of the lead screw, to thereby obstruct further movement of said follower along said lead screw toward said motor; and wherein said step of securing said stop to said follower in a particular location comprises selecting a mounting position for said stop upon said follower from several possible such mounting positions.

14. For use in data-storage apparatus, a method of setting a closest point of approach between a motor and a head-positioning lead screw follower moved by said motor, comprising the steps: using a lead screw to carry and abutment which rotates with said lead screw and is disposed at a preselected location spaced radially from said lead screw and generally defining said closest point; and using said follower to carry a stop element at a location spaced from said follower in a direction toward said closest point and disposed radially from said lead screw by an amount sufficient to bring said stop element and said abutment into angular contact with one another along an arcuate path spaced radially from said lead screw when said follower has reached said closest point of approach, thereby precluding frictional jamming of said follower with respect to said lead screw; including the steps of fixing said abutment on said lead screw, selecting said closest point of approach by moving said follower along said lead screw toward said motor until the follower reaches a desired proximity with said motor, and securing said stop to said follower in a particular location at which it is positioned to contact said abutment upon further rotation of the lead screw, to thereby obstruct further movement of said follower along said lead screw toward said motor; and wherein said step of securing said stop to said follower comprises the slidable insertion of a stop member into a complementary receptacle carried by said follower.

15. The method set forth in claim 14, wherein said slidable insertion comprises the insertion of a pin-like member into a complementary recess.

16. The method set forth in claim 15, wherein said slidable insertion comprises press-fitting said pin into said recess.

* * * * *